United States Patent [19]

Bryan et al.

[11] Patent Number: 4,732,688

[45] Date of Patent: Mar. 22, 1988

[54] EFFLUENT TREATMENT

[75] Inventors: Stephen J. Bryan, High Shincliffe; Martyn V. Twigg, Yarm, both of England

[73] Assignee: Imperial Chemical Industries PLC, London, England

[21] Appl. No.: 886,262

[22] Filed: Jul. 16, 1986

[30] Foreign Application Priority Data

Jul. 29, 1985 [GB] United Kingdom ................. 8519059

[51] Int. Cl.$^4$ ................................................ C02B 1/34
[52] U.S. Cl. .................................... 210/753; 210/756; 210/759; 210/763; 423/579; 502/335
[58] Field of Search ............... 210/753, 756, 758, 759, 210/763; 423/579

[56] References Cited

U.S. PATENT DOCUMENTS

| | | | |
|---|---|---|---|
| 3,944,487 | 3/1976 | Davis et al. | 423/473 |
| 3,965,249 | 6/1976 | Kinosz | 210/763 |
| 4,029,578 | 6/1977 | Turk | 210/763 |
| 4,073,873 | 2/1978 | Caldwell et al. | 210/763 |
| 4,297,333 | 10/1981 | Crawford et al. | 210/763 |
| 4,400,304 | 8/1983 | Clark et al. | 210/763 |
| 4,508,697 | 4/1985 | Burrus | 210/757 |
| 4,562,163 | 12/1985 | Endo et al. | 423/290 |
| 4,683,065 | 7/1987 | Sheikh | 210/759 |

FOREIGN PATENT DOCUMENTS

| | | | |
|---|---|---|---|
| 42446 | 4/1978 | Japan | 210/759 |
| 136749 | 10/1979 | Japan | 210/763 |

Primary Examiner—John Doll
Assistant Examiner—Wayne A. Langel
Attorney, Agent, or Firm—Cushman, Darby & Cushman

[57] ABSTRACT

A process for treating effluent wherein an oxidizing agent in the effluent is decomposed on contact with a catalyst bed. The oxidizing agent can be a pollutant present in the effluent, for example hypochlorite in the effluent from chlorine-producing brine electrolysis cells or from the scrubbing of chlorine gas. In an alternative the effluent may contain oxidizable pollutants and the oxidizing agent is purposefully added thereto. Passage over the catalyst bed catalyzes the decomposition of the oxidizing agent and oxidizable pollutants.

The catalyst bed comprises an intimate mixture of an oxide of Group III, nickel oxide and, optionally, cobalt oxide, supported on pieces of a non-porous substantially inert material.

9 Claims, No Drawings

EFFLUENT TREATMENT

This invention relates to a process of effluent treatment and in particular relates to a process of catalytically decomposing an oxidising agent in effluent to be treated.

Effluent from various industrial processes and sewage works contains a range of pollutants, both soluble and insoluble. The present invention provides a process of decomposing pollutants which are oxidising agents, and also utilising this process to destroy further pollutants by oxidation. There is a number of oxidising agents that constitute a pollution hazard in effluent, mainly from industrial processes, for example hypochlorite and hydrogen peroxide. In particular many industrial waste streams contain hypochlorite which is corrosive and toxic. Hypochlorite containing aqueous solutions are employed in bleaching operations and are produced, as a by-product, in the effluent from chlorine-producing brine electrolysis cells and by the scrubbing of chlorine gas. Decomposition of the hypochlorite ions is desirable before the effluent from such industrial operations is discharged into the public water system. In addition decomposition of hypochlorite ions in the effluent from a chlorine-producing brine electrolysis cell is desirable prior to discharge or recycle of the effluent to the electrolysis cell with fresh brine.

One method of decomposing hypochlorite ions has been to add to the effluent a reducing agent such as sulphite or bisulphite ions. This treatment can be very expensive when large quantitites of effluent are involved. It has been proposed that heterogeneous fixed-bed catalysts should be used and a number of catalysts has been described in the literature; for example Kinosz, U.S. Pat. No. 3,965,249, discloses the use of oxides of cobalt, copper and nickel and Crawford et al, U.S. Pat. No. 4,297,333, disclose the use of a solid comprising nickel oxide and bimetal $NiCo_2O_4$ spinel.

Caldwell et al., U.S. Pat. No. 4,073,873, propose the use of a supported cobalt oxide catalyst wherein the cobalt is in the form of a cobalt oxide single metal spinel. It is suggested that adherence to the support can be improved by the incorporation of an inert modifier oxide. The examples suggest that the presence of a modifier has an adverse effect on activity.

Crawford et al., U.S. Pat. No. 4,297,333, propose the use of a supported catalyst wherein the active material is a mixture of nickel oxide and nickel/cobalt spinel ($NiCo_2O_4$). That reference shows that whilst the cobalt single metal spinel is significantly more active than the nickel/cobalt spinel alone, the activity of a mixture of nickel oxide and nickel/cobalt spinel increases with increasing nickel oxide content to a level similar, or slightly superior, to that of the cobalt single metal spinel.

Clark et al., U.S. Pat. No. 4,400,304, disclose that there are certain drawbacks to the commercial application of such catalysts. It is stated that the high alkalinity of hypochlorite solutions causes the binder support of most tabletted and extruded catalysts to disintegrate. U.S. Pat. No. 4,400,304 proposes to overcome this problem by using finely divided oxides of certain metals, in particular cobalt, bound together with a specialty thermoplastic resin binder for example polyvinylidene fluoride. While this allows the catalyst to withstand alkaline conditions the cost of the speciality resin makes the catalyst composition expensive.

In another aspect of the art it has been proposed that the decomposition of a hypochlorite oxidising agent into oxygen atoms causes oxidation of pollutants in aqueous systems. Davis et al., U.S. Pat. No. 3,944,487, disclose that a granular, porous catalytic material of an oxide of nickel, cobalt, iron or iridium can catalyse the decomposition of hypochlorite ions into oxygen atoms which oxidise pollutants in raw sewage. The catalytic material is stated to be regenerated by incineration.

The present invention relates to the treatment of effluent containing an oxidising agent, for example hypochlorite, whether said oxidising agent is part of the effluent from an industrial process or whether said oxidising agent is purposefully added in order to aid the oxidation of other pollutants.

The present invention avoids the necessity of providing an expensive speciality resin binder and provides a catalytic system of good activity and good stability.

Accordingly the present invention provides a process for decomposing an oxidising agent in effluent to be oxidatively treated which comprises contacting said effluent with a catalyst bed comprising an intimate mixture of:
  (i) at least one finely divided oxide of an element (M) of Group III of the Periodic Table,
  (ii) finely divided nickel oxide,
and/or hydrates of said Group III oxide or nickel oxide, supported on pieces of a non-porous substantially inert material, said intimate mixture containing 0.5 to 50% by weight of said Group III oxide (expressed as $M_2O_3$).

The catalyst bed contains an intimate mixture of at least one finely divided Group III oxide and nickel oxide. In one aspect finely divided cobalt oxide and/or hydrate thereof can be incorporated. The amount of cobalt oxide, if any, should be such that the cobalt:nickel atomic ratio is below 1.0, preferably below 0.5 and in particular below 0.1. If cobalt oxide and/or hydrate is incorporated the combined weight of said cobalt oxide and said nickel oxide is in the range 50–99.5% by weight of the intimate mixture, i.e. the Group III oxide is present in the range 0.5–50% by weight.

Suitable Group III elements include boron, yttrium, aluminium and the rare earth elements. In one aspect aluminium and the rare earths, other than cerium, are preferred. In particular aluminium in the active form such as chi, eta or gamma alumina is preferred. Gamma-alumina is most preferred. The alumina may be partially hydrated. In another aspect boron is preferred as it gives particularly good activity.

The finely divided Group III oxide, for example alumina, by itself has no significant catalytic activity in the process of this invention. However, when in intimate admixture with the finely divided nickel oxide, said Group III oxide has a significant promotor effect on the activity of said nickel oxide. The Group III oxide is present in the intimate mixture in the range 0.5–50% by weight with respect to the nickel oxide and cobalt oxide, if any. Preferably the Group III oxide is present in the range 0.5–25%, more preferably 1.0–20% and in particular about 10% by weight.

A promotor effect of alumina on nickel and cobalt oxide catalysts was reported in 1926 by Chirnoaga, J. C. S. 1926 p.1693–1703. This concerned unsupported, uncalcined catalysts; the oxides were employed in the form of aqueous suspensions which were mixed with the hypochlorite solution being treated. The present invention relates to supported, calcined catalysts which behave in a manner that can not be predicted from the teachings of Chirnoaga since Chirnoaga shows that nickel oxide is more active than cobalt oxide. This is contrary to the findings with supported, calcined catalysts, see for example Kinosz, U.S. Pat. No. 3,965,249. In addition, Chirnoaga reports that there is some synergism between nickel oxide and cobalt oxide, showing that at cobalt:nickel atomic ratios at least between about 0.9 and 8, the activity of a mixture of oxides was superior to either oxide alone. Maximum activity was reported to occur at a cobalt:nickel atomic ratio of about 2 (30% nickel oxide). In contrast, in supported catalysts, Crawford et al., U.S. Pat. No. 4,297,333, show that at a cobalt:nickel atomic ratio of 2 the activity is less than that of cobalt oxide. Furthermore, as mentioned above, Caldwell et al., U.S. Pat. No. 4,073,873, incorporate modifier oxides into supported catalysts. These modifier oxides include zirconia, vanadia, lead oxide and alumina. The examples suggest that the presence of a modifier oxide has an adverse effect on activity.

In the present invention the support material is pieces of non-porous material. It has a surface area, measured by the Brunauer-Emmett-Teller method using nitrogen, of suitably less than 10, preferably less than 5, and in particular less than 1, $m^2g^{-1}$. Suitably it has a pore volume of less than 0.1 $mlg^{-1}$. The non-porous material can be any material that can support the intimate mixture and is substantially stable in the presence of the alkaline conditions under which the process is generally performed. Suitable support materials include chlorinated and fluorinated resins, metals such as palladium and platinium, film-forming metals such as zirconium, and other materials such as graphite, mineral fibres, alumina, zirconia, spinels (for example magnesium spinel) and alumina-based ceramics, and mixtures thereof. Preferably the support material is oxidic. The pieces of the support material can have a regular shape, for example as formed by pelleting or moulding an oxidic composition, for example gamma alumina, and firing the pelleted or moulded composition to provide a regular non-porous material. In an alternative the pieces of the support material can be made by fragmentation to provide irregular shapes and sizes of the non-porous oxidic material. Conveniently the pieces, either regular or irregular, have a maximum average dimension of less than 25 mm, preferably of less than 10 mm, for example about 1-3 mm. In one aspect the pieces may be the size of sand particles (fine, average or coarse-grained), for example having an average dimension of 0.1-0.5 mm.

We have found that catalysts formed by providing the intimate mixture of oxides supported on pieces of the non-porous material give improved activity as compared to catalysts wherein the intimate mixture is impregnated in a porous support. In addition we have found that catalysts formed by providing the intimate mixture of oxides supported on pieces of the non-porous material give improved lifetime as compared to catalysts wherein the oxides are precipitated and formed into granules.

The oxides of nickel and cobalt, if present, may be obtained in finely divided form in any convenient manner. One suitable manner comprises dipping the non-porous support into an aqueous solution containing a nickel salt and cobalt salt, if desired, said salts being decomposable by heat to form the oxides, and subsequently calcining the coated support to effect the decomposition of said salts. Conveniently the salts are nitrates. The Group III oxide conveniently can be incorporated, prior to dipping into the salt solution, by dipping the non-porous support into an aqueous solution containing a salt of a Group III element, said salt being decomposable by heat to form an oxide for example a nitrate, and subsequently heating to form the Group III oxide. In a preferred method the Group III oxide, nickel oxide and cobalt oxide, if desired, can be incorporated simultaneously by dipping the non-porous support pieces into an aqueous solution containing salts of the Group III element, nickel and optionally cobalt, said salts being decomposable by heat, and then calcining the dipped pieces.

The calcination step can conveniently be carried out at temperatures in the range 200° to 600° C., more suitably in the range 400°-550° C.

The dipping of the support and subsequent calcination steps can be performed more than once, if desired, in order to achieve the requisite loading level of the intimate mixture on the support. In order to improve the loading of the intimate mixture on to the support, the support surface can be roughened for example mechanically or by chemical etching.

The weight of the calcined intimate mixture is suitably in the range 0.5 to 12%, preferably 1 to 10%, particularly 3 to 10% by weight of the combined weight of the support and intimate mixture.

In use the catalyst bed is contacted with effluent containing oxidising agent which is to be oxidatively treated. Suitable oxidising agents include hypohalite ions, for example hypochlorite and hypobromite ions, hydrogen peroxide and periodate ions. Some, at least, of such oxidising agents are pollutants in various industrial processes. In particular hypochlorite ions are a significant industrial pollutant as mentioned hereinbefore.

Conveniently the catalyst is formed into a bed in conventional manner and the effluent containing pollutant, for example hypochlorite ions, is passed through the bed. Generally the effluent is in the form of an aqueous solution which has been filtered prior to contact with the catalyst bed.

As mentioned hereinbefore, the process of decomposing pollutants which are oxidising agents can be utilised to destroy further pollutants by oxidation. In this way, with the deliberate addition of an oxidising agent for example hypochlorite ion, many organic pollutants can be effectively and efficiently minimised. Such organic pollutants can be substantially decomposed oxidatively into carbon dioxide and water. Thus there is no further effluent treatment required as the oxidation products are harmless. Examples of effluent that can be treated include hydrocarbon chemical plant effluent, methanol manufacture effluent, dye plant wastewater, domestic sewage and the like. Examples of organic pollutants which can be present in such effluent, and which can be substantially removed by the process of the present invention include alcohols for example methanol and ethanol, chlorinated hydrocarbons for example chloroform, carbon tetrachloride and dichloromethane, cyanide, hydrazine, ammonia, formic acid, formaldehyde, amines for example methylamine and sugars for example glucose.

Conveniently an aqueous solution of the oxidising agent, for example hypochlorite, is prepared and admixed with the effluent to be treated. The mixture of effluent and oxidising agent is subsequently passed over the catalyst bed.

The amount of oxidising agent required to be admixed with the effluent for effective treatment thereof depends on a variety of parameters, including the COD (Chemical Oxygen Demand) of the effluent, the temperature at which the treatment is performed and the activity of the catalyst being used. The oxidising agent itself is a pollutant, however it is a particular benefit of the process that excess oxidising agent will be decomposed by the catalyst bed or, if desired, by passage through a further catalyst bed.

For the decomposition of the oxidising agent, either alone or in the presence of organic pollutants, the process of this invention is conveniently effected wherein the pH level of the effluent is above 6, preferably above 7, and it is a particularly beneficial aspect that the catalyst does not physically disintegrate at pH levels in the range 10 to 13. The temperature at which the process is performed is preferably above ambient, for example in the range 50°–100° C.

In use the catalyst is contacted with the oxidising agent. On such contact in aqueous solution some or all of the oxides of the intimate mixture may become hydrated. In addition the nickel oxide, and cobalt oxide if present, are oxidised to higher valency states. For example nickel oxide can be notionally considered to be initially formed on the catalyst support as NiO. Authorities vary as to precisely what higher oxides of nickel are formed but it may be regarded that the higher oxides $Ni_3O_4$, $Ni_2O_3$ and $NiO_2$ are formed on contact with the oxidising agent. Such higher oxides are active in the process of the present invention. Thus the process of the present invention covers the oxides of nickel, cobalt if present, and the Group III element (M) both as initially formed on the catalyst support and in their higher oxidation states, as formed in situ. As stated hereinbefore the present invention also covers the use of hydrates in decomposing the oxidising agent. It should be noted, however, that the proportions specified herein of the nickel oxide, cobalt oxide and Group III oxide, relative to each other and relative to the non-porous support are expressed on the basis of the anhydrous oxides with the nickel and cobalt oxides in the divalent state, i.e. NiO and CoO, and with the Group III oxide in the trivalent state, i.e. $M_2O_3$.

As mentioned hereinabove the catalyst is oxidised by the oxidising agent to convert the nickel oxide and cobalt oxide, if present, to a higher oxidation state. If desired such oxidation can be effected prior to charging the catalyst to the vessel in which the effluent is to be treated.

One particular application of the present invention is in decomposing hypochlorite ions present in the brine effluent from a chlorine producing electrolysis cell, prior to the recycling of the brine. In a preferred form of such an electrolysis process the brine from the electrolysis cell is first acidified to a pH of less than 5 by the addition of an acid to assist the removal of dissolved chlorine. After the removal of dissolved chlorine, for example by physical means, alkali is added to adjust the pH to above 9 and the alkaline brine is recycled to the electrolysis cell together with fresh brine, sometimes after an ion-exchange step. The hypochlorite decomposition is effected after alkali addition and preferably before any ion exchange step. The hypochlorite decomposition may be effected before or after the addition of fresh brine. Typically in such a process the influent brine at the hypochlorite decomposition stage contains about 10 to 1000 ppm by weight of hypochlorite ion, about 5 to 30% by weight of sodium chloride, has a pH of about 9 to 12, and is at a temperature of about 70° to 90° C.

Certain of the catalysts used in the process of this invention appear to be known per se, whilst others are novel.

EP-A-45126 describes precursors of catalysts intended for use in steam reforming of hydrocarbons which comprise a low porosity refractory support for example alpha-alumina, carrying a refractory oxide secondary support of gamma-alumina, and preferably other oxides for example cerium, which in turn is impregnated with a nickel salt and then calcined to produce nickel oxide within the secondary support. In the specific precursors described the secondary support formed about 40 to 60% by weight of the combined weight of nickel oxide and secondary support.

British Patent No. 1,211,847 is also concerned with steam reforming and, in Example 1, discloses the preparation of a catalyst wherein a support of pelleted alumina is impregnated with nickel oxide, potassium oxide and alumina.

In steam reforming the nickel oxide is reduced to an active nickel species whereas in the present invention, as discussed hereinabove, the nickel oxide and cobalt oxide, if any, is oxidised to a higher oxidation state, either prior to use or during use. As discussed hereinabove precisely what higher oxides nickel forms is open to discussion. It also appears from the literature that the 'nickel oxide' obtained by calcining heat decomposable nickel compounds at above about 400° C. in air is not pure NiO, but contains a small excess of oxygen in such an amount that the 'nickel oxide' corresponds to a mixture of NiO and the sesquioxide $Ni_2O_3$ containing about 2 to 3% by weight of $Ni_2O_3$.

In the catalysts of this invention nickel oxide and cobalt oxide, if present, is oxidised prior to, or during the process to an oxidation state significantly greater than that of the 'nickel oxide' formed by simple calcination and in general is oxidised to an oxidation state such that R is greater than 2.4 where:

$$R = \frac{2(O) - (H)}{(X)}$$

wherein (O) and (H) represent the atomic proportions of oxygen and hydrogen, if any, respectively and (X) represents the atomic proportions of nickel and cobalt, if present, in the nickel (and cobalt) oxide or hydrate thereof.

Accordingly in another aspect of the present invention there is provided an intimate mixture comprising:
  (i) at least one finely divided oxide of an element (M) of Group III of the Periodic Table,
  (ii) finely divided nickel oxide,
and/or hydrates thereof, supported on pieces of a non-porous substantially inert material, wherein:
  (a) said intimate mixture contains 0.5 to 25% by weight of said Group III oxide (expressed as $M_2O_3$); and/or
  (b) said intimate mixture contains 0.5 to 50% by weight of said Group III oxide (expressed as $M_2O_3$) and the oxidation state is such that R, as defined hereinabove, is greater than 2.4.

Preferred and particular catalysts of the present invention are as described hereinbefore with respect to the use of the catalysts in the process of this invention.

The invention is illustrated by the following examples.

EXAMPLES 1-5

Non-porous alpha-alumina chips, obtained by fragmenting alumina that had been calcined at above 1600° C., and having a size such that 100% by weight pass through a 2.36 mm mesh and 93% by weight are retained on a 1.41 mm mesh, were dipped at room temperature into an aqueous solution containing, per liter, 1000 g of nickel nitrate hexahydrate and 430 g of aluminium nitrate nonahydrate. The dipped alpha-alumina chips were drained, dried, and then calcined at 475° C. for 3 hours. The dipping/calcination process was repeated five times with samples taken for testing after each calcination. The coating, i.e. the intimate mixture of nickel oxide and alumina, contained about 18.5% by weight alumina expressed as $Al_2O_3$.

The hypochlorite decomposition activity was assessed by adding 5 ml of the catalyst to 500 ml of an aqueous solution of pH 10.7 containing 1000 ppm by weight of sodium hypochlorite and maintained at 80° C. At intervals samples were taken and analysed for residual hypochlorite. From a plot of the residual hypochlorite concentrations against time, the rate constant, assuming first order reaction, is determined. The activity quoted in the following table is the rate constant, in units of $min^{-1}$, for 5 ml of catalyst in 500 ml of 1000 ppm sodium hypochlorite solution.

| Example | No. of dips | Proportion of intimate mixture in catalyst (% w/w) | Activity ($min^{-1}$). |
| --- | --- | --- | --- |
| 1 | 1 | 2.5 | 0.021 |
| 2 | 2 | 4.4 | 0.030 |
| 3 | 3 | 6.5 | 0.034 |
| 4 | 4 | 8.5 | 0.031 |
| 5 | 5 | 10.7 | 0.033 |

These Examples demonstrate that 3 dipping/calcination steps are generally sufficient to obtain an adequate loading of the active material on the support.

By way of comparison a commercially available poly vinylidene fluoride bound oxide based hypochlorite decomposition catalyst had an activity of 0.033 $min^{-1}$. Hence it is seen that the catalysts of the invention had a similar activity to that of the commercial catalyst without the need for the expensive polymeric binder.

EXAMPLES 6-10

The procedure of Example 3 was repeated, i.e. employing 3 dipping/calcination steps, using alpha-alumina chips of the same size but from another batch and using aqueous solutions containing differing amounts of nickel and aluminium nitrates.

| Example | Dipping solution molarity Ni | Dipping solution molarity Al | % w/w intimate mixture in catalyst | % w/w $Al_2O_3$ in intimate mixture | Activity ($min^{-1}$). |
| --- | --- | --- | --- | --- | --- |
| 6 | 3.44 | 0.03 | 6.9 | 0.6 | 0.027 |
| 7 | 3.21 | 0.20 | 8.5 | 3.5 | 0.049 |
| 8 | 2.88 | 0.43 | 9.3 | 9.6 | 0.047 |
| 9 | 2.29 | 0.83 | 9.3 | 20.4 | 0.045 |
| 10 | 1.47 | 1.43 | 5.4 | 40.7 | 0.036 |
| CT1 | 3.44 | 0 | 7.4 | 0 | 0.015 |
| CT2 | 0 | 1.78 | 1.3 | 100 | <0.001 |
| CT3 | 0.86 | 1.88 | 1.0 | 60 | 0.016 |

*calculated from increase in weight of chips and constitution of dipping solution.

These Examples show that the optimum activity is obtained with between about 0.5 and 40% by weight of alumina in the intimate mixture. The comparative tests (CT) show the effect of nickel alone (CT1), alumina alone (CT2) and a mixture with a high proportion of alumina (CT3).

EXAMPLE 11

The procedure of Examples 6-10 was repeated using solutions in which some or all of the nickel nitrate was replaced by cobalt nitrate. The results are quoted in the Table below together with the results from Example 2 and CT1.

| Example | Dipping solution molarity Ni | Dipping solution molarity Co | Dipping solution molarity Al | % w/w intimate mixture in catalyst | % w/w $Al_2O_3$ in intimate mixture* | Co:Ni atomic ratio* | Activity ($min^{-1}$). |
| --- | --- | --- | --- | --- | --- | --- | --- |
| CT4 | 0 | 3.44 | 0 | 4.7 | 0 | ∞ | 0.016 |
| CT5 | 0 | 2.70 | 1.05 | 4.7 | 21 | ∞ | 0.014 |
| CT6 | 2.29 | 1.14 | 0 | 4.1 | 0 | 0.5 | 0.017 |
| 11 | 1.80 | 0.90 | 1.05 | 3.4 | 21 | 0.5 | 0.031 |
| CT1 | 3.44 | 0 | 0 | 7.4 | 0 | 0 | 0.015 |
| 2 | 3.4 | 0 | 1.15 | 4.4 | 18.5 | 0 | 0.030 |

*calculated from increase in weight of chips and dipping solution composition.

Comparison of CT1 and CT4 shows that, in the absence of alumina in intimate association with the active oxide, cobalt oxide is marginally superior to nickel oxide. However from CT5 it is seen that the incorporation of alumina in intimate association with cobalt oxide has an adverse effect on activity whereas Example 2 (and also Examples 6-10) shows that its inclusion in a nickel oxide system has a marked effect on activity. CT6 shows that the use of nickel oxide/cobalt oxide mixtures having a cobalt:nickel atomic ratio of 0.5, without alumina, is only slightly superior in activity to nickel or cobalt oxides alone. Example 11 shows that the addition of alumina to nickel/cobalt oxide mixtures of of Co:Ni atomic ratio 0.5 has a significant effect, but not so large as in compositions containing no cobalt (see Examples 9 and 10).

EXAMPLE 12

The procedure of Example 6 was repeated using lanthanum nitrate (0.03 M) in place of aluminium nitrate. The catalyst contained 5.1% by weight of an intimate mixture of nickel oxide and lanthanum oxide, and the lanthanum oxide content of the intimate mixture was 2% by weight. The activity was 0.019 $min^{-1}$.

EXAMPLE 13

The procedure of Example 6 was repeated using boric acid (0.81 M) in place of aluminium nitrate. The catalyst contained 6.8% by weight of an intimate mixture of nickel oxide and boron oxide, and the boron oxide content of the intimate mixture was 10.3% by weight. The activity was 0.095 min$^{-1}$.

EXAMPLE 14

2 kg of non-porous fused alpha-alumina chips of bulk density 2.1 g.cm$^{-3}$, containing 99.5% w/w Al$_2$O$_3$, 0.3% w/w Na$_2$O, and 0.03% w/w SiO$_2$, of size such that 100% w/w passed a 2.36 mm screen and 93.6% w/w were retained on a 1.41 mm screen were immersed in 1 liter of aqueous nickel nitrate (3.44 M) and aluminium nitrate (0.63 M) for 10 minutes. The chips were drained for 1 hour, and then placed in a cold furnace which was then heated to 350° C. After maintaining the temperature at 350° C. for 2 hours the temperature was raised to 475° C. and maintained at that temperature for 3 hours. The coated chips were then cooled. The dipping/calcination procedure was repeated twice. The final product was sieved and washed to remove dust and dried. The product contained about 5% w/w of nickel oxide/active alumina in a weight ratio of about 90:10.

200 g (approx. 100 ml) of the coated chips were charged to glass tube of 2.5 mm internal diameter mounted vertically in an oil bath. An aqueous solution (pH 10.7) containing about 1400-1500 ppm by weight sodium hypochlorite was continuously passed at a predetermined rate through a preheating coil to the bottom of the glass tube, up the tube and then to drain. Ports were provided to take samples of the influent and effluent solution for analysis for the hypochlorite content. The amount of hypochlorite decomposed was determined at various temperatures and flow rates. The temperature of the oil bath was controlled by a thermostat. The liquid feed rate was controlled by a peristaltic pump. After changing temperatures or flow rates the system was allowed to achieve steady state conditions by waiting for at least 30 min. before taking samples.

The analysis for hypochlorite consisted of reaction with potassium iodide in dilute acetic acid, followed by titration of the liberated iodine with sodium thiosulphate using starch indicator.

The results are shown in the following table. Even

| Temperature (°C.) | Feed rate (1. hr$^{-1}$) | exit hypochlorite concentration (ppm) | hypochlorite decomposed (%) |
|---|---|---|---|
|  | 1.0 | 220 | 85 |
|  | 1.2 | 279 | 80 |
| 50 | 0.5 | 0 | 100 |
|  | 1.0 | 18 | 99 |
|  | 1.3 | 71 | 95 |
|  | 1.6 | 142 | 90 |
|  | 1.8 | 197 | 87 |
|  | 2.0 | 287 | 81 |
| 60 | 1.6 | 4 | >99 |
|  | 2.0 | 18 | 99 |
|  | 2.8 | 78 | 95 |
|  | 3.3 | 145 | 90 |
|  | 3.5 | 179 | 88 |
|  | 4.0 | 242 | 84 |
| 70 | 2.4 | 0 | 100 |
|  | 3.2 | 6 | >99 |
|  | 4.0 | 25 | 98 |
|  | 4.5 | 45 | 97 |
|  | 5.0 | 89 | 94 |
|  | 5.5 | 97 | 93 |
| 80 | 5.5 | 0 | 100 |
|  | 6.0 | 14 | 99 |

In all of the above Examples and in CT1, CT3 and CT6, the nickel oxide, and cobalt oxide in Example 11 and CT6, was oxidised during the hypochlorite degradation to an oxidation state such that R, as hereinbefore defined, exceeded 2.4.

EXAMPLES 15-25

In these examples separate reservoirs of an aqueous solution of the oxidising agent and the effluent to be treated were prepared. The solutions are pumped from their respective reservoirs through feed lines to a mixing point. The mixed solution is pumped through the preheating coil to the bottom of the glass tube (see Example 14) and thence through the catalyst bed. Analyses of the exit streams were performed using gas liquid chromatography/mass spectroscopy and high pressure liquid chromatography.

The catalyst used was prepared as in Example 14. The oxidising agent was sodium hypochlorite. The two solutions, in each case, were mixed in equal volumes.

| Ex | Pollutant | Temperature °C. | Flow Rate 1 hr$^{-1}$ | Concentration (ppm) Pollutant | | Concentration (ppm) Hypochlorite | |
|---|---|---|---|---|---|---|---|
|  |  |  |  | Inlet | Outlet | Inlet | Outlet |
| 15 | Methanol | 40 | 1 | 1000 | 20 | 6000 | 500 |
| 16 | Ethanol | 40 | 1 | 1000 | 25 | 6000 | 400 |
| 17 | Formic acid | 30 | 0.72 | 500 | ND | 2500 | 30 |
| 18 | Formaldehyde | 40 | 0.6 | 1000 | ND | 5000 | 18 |
| 19 | Paraformaldehyde | 40 | 0.6 | 1000 | ND | 6000 | 37 |
| 20 | Dichloromethane | 30 | 0.15 | 5000 | ND | 10000 | 800 |
| 21 | Chloroform | 50 | 1 | 500 | ND | 6000 | 600 |
| 22 | Carbon tetrachloride | 40 | 0.25 | 1000 | ND | 2000 | 250 |
| 23 | Hydrazine | 40 | 0.5 | 650 | <1 | 6000 | 800 |
| 24 | Potassium cyanide | 40 | 1 | 100 | <1 | 500 | 40 |
| 25 | Ammonia | 30 | 1 | 5 | ND | 25 | 2 | after about 2 weeks operation of various flow rates and temperatures in the range 40° to 80° C., there was no evidence of any catalyst deactivation.

| Temperature (°C.) | Feed rate (1. hr$^{-1}$) | exit hypochlorite concentration (ppm) | hypochlorite decomposed (%) |
|---|---|---|---|
| 40 | 0.25 | 4 | >99 |
|  | 0.5 | 33 | 98 |
|  | 0.75 | 142 | 90 |

In a comparative run with Example 15, equal volumes of methanol (2000 ppm) and hypochlorite (7000 ppm) were passed over alpha-alumina chips (calcined at 1600° C. and fragmented as in Example 1) that had no coating. The methanol concentration only fell to 725 ppm.

EXAMPLE 26

In a manner similar to Examples 15-25, using the same equipment and catalyst an effluent having the following composition was treated.

| | |
|---|---|
| Ammonia (as N) | 585 ppm |
| Methanol | 1300 ppm |
| Methylamine | 10 ppm |
| Dimethylamine | 10 ppm |
| Trimethylamine | 50 ppm |

To this effluent an equal volume of sodium hypochlorite solution (29500 ppm) was added and the mixture was passed over the catalyst at 60° C. at a flow rate of 1 lhr$^{-1}$. The exit stream analysed as <1 ppm ammonia, 20 ppm methanol and <10 ppm total amines.

In a comparative run equal volumes of the process condensate and sodium hypochlorite solution (29000 ppm) were passed over alpha-alumina chips (calcined at 1600° C. and fragmented as in Example 1) that had no coating. The exit stream analysed as 1 ppm ammonia, <15 ppm amines and 360 ppm methanol.

EXAMPLE 27

In a manner similar to Example 26, solutions containing approximately 20 ppm of either methylamine, dimethylamine or trimethylamine were mixed with an equal volume of sodium hypochlorite solution (500 ppm) and passed over the catalyst at 1 lhr$^{-1}$ at 40° C. In each case the exit stream analysed for <50 ppm hypochlorite and over 75% of the amine had been removed.

EXAMPLE 28

In a manner similar to Example 26, using the same equipment and catalyst, a solution of hydrogen peroxide (1500 ppm) and sodium hydroxide (10 gl$^{-1}$) was passed over the catalyst at a flow rate of 1 lhr$^{-1}$ at 40° C. The exit stream analysed for 35 ppm hydrogen peroxide.

We claim:

1. A process for decomposing an oxidising agent in effluent to be oxidatively treated which comprises contacting said effluent with a catalyst bed comprising an intimate mixture of:
   (i) at least one finely divided oxide of an element (M) of Group III of the Periodic Table,
   (ii) finely divided nickel oxide,
   and/or hydrates of said Group III oxide or nickel oxide, supported on pieces of a non-porous substantially inert material, said intimate mixture containing 0.5 to 50% by weight of said Group III oxide (expressed as $M_2O_3$).

2. A process according to claim 1 wherein some of the nickel oxide in the intimate mixture is replaced by finely divided cobalt oxide and/or hydrate thereof so that there is a cobalt:nickel atomic ratio of less than 1.0.

3. A process according to claim 1 wherein the Group III oxide comprises gamma alumina.

4. A process according to claim 1 wherein the Group III oxide comprises an oxide of boron.

5. A process according to claim 1 wherein the intimate mixture contains 0.5-25% (by weight) of the finely divided Group III oxide and/or hydrate thereof.

6. A process according to claim 1 wherein the intimate mixture is 2-12% (by weight) of the combined weight of the intimate mixture and support material.

7. A process according to claim 1 wherein the oxidising agent is selected from hypohalite ions, hydrogen peroxide and periodate ions.

8. A process according to claim 7 wherein the oxidising agent comprises hypochlorite ions.

9. A process of destroying oxidisable pollutants in an aqueous medium which comprises adding an oxidising agent to said medium and contacting said medium containing oxidising agent with a catalyst bed comprising an intimate mixture of:
   (i) at least one finely divided oxide of an element (M) of Group III of the Periodic Table,
   (ii) finely divided nickel oxide,
   and/or hydrates of said Group III oxide or nickel oxide, supported on pieces of a non-porous substantially inert material, said intimate mixture containing 0.5 to 50% by weight of said Group III oxide (expressed as $M_2O_3$), whereby the catalyst bed catalyses the decomposition of the oxidising agent and oxidisable pollutants.

* * * * *